Figure 1:
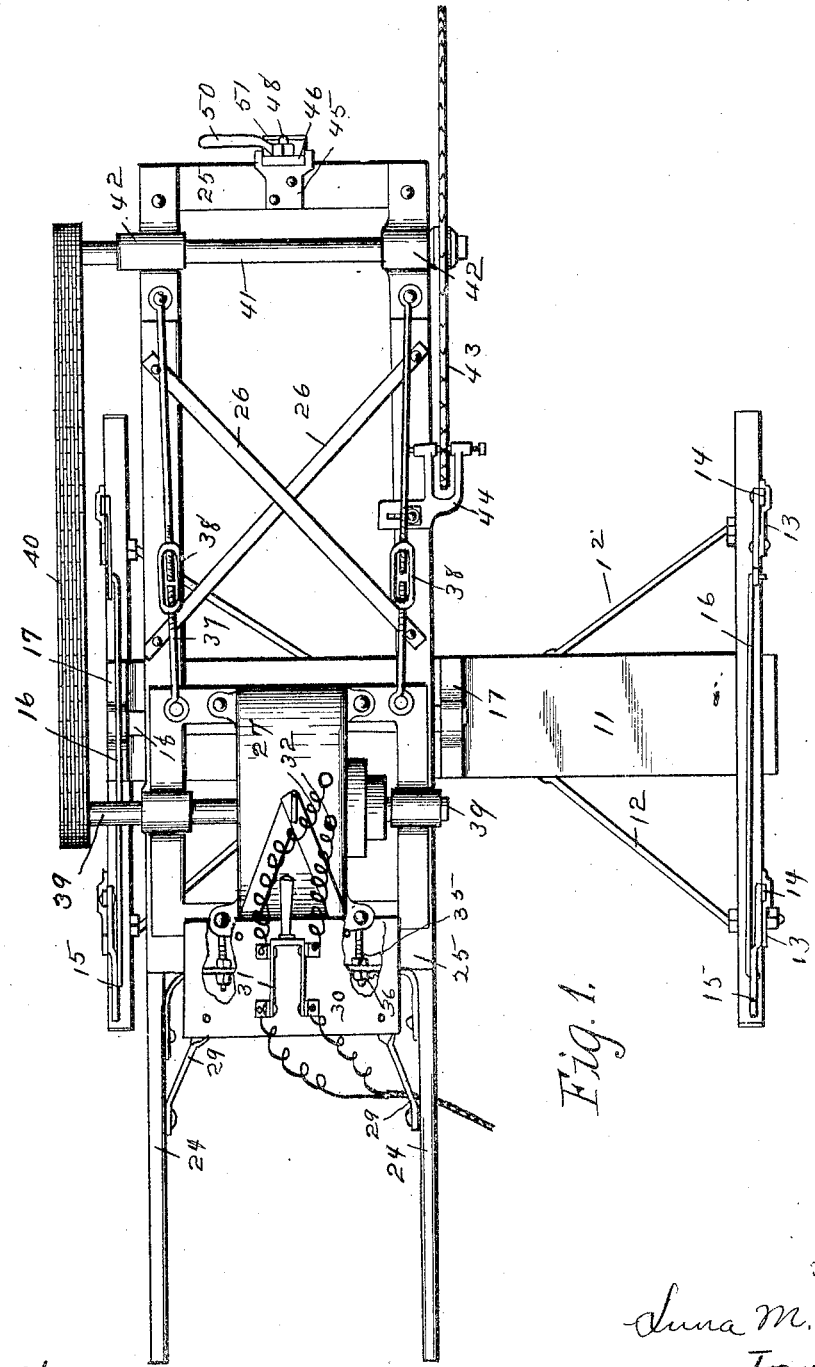

L. M. MACY.
ICE CUTTING MACHINE.
APPLICATION FILED JUNE 20, 1907.

1,102,989.

Patented July 7, 1914.
2 SHEETS—SHEET 1.

Witnesses
A. G. Hague
S. F. Christy

Luna M. Macy.
Inventor
by Orwig & Lane attys

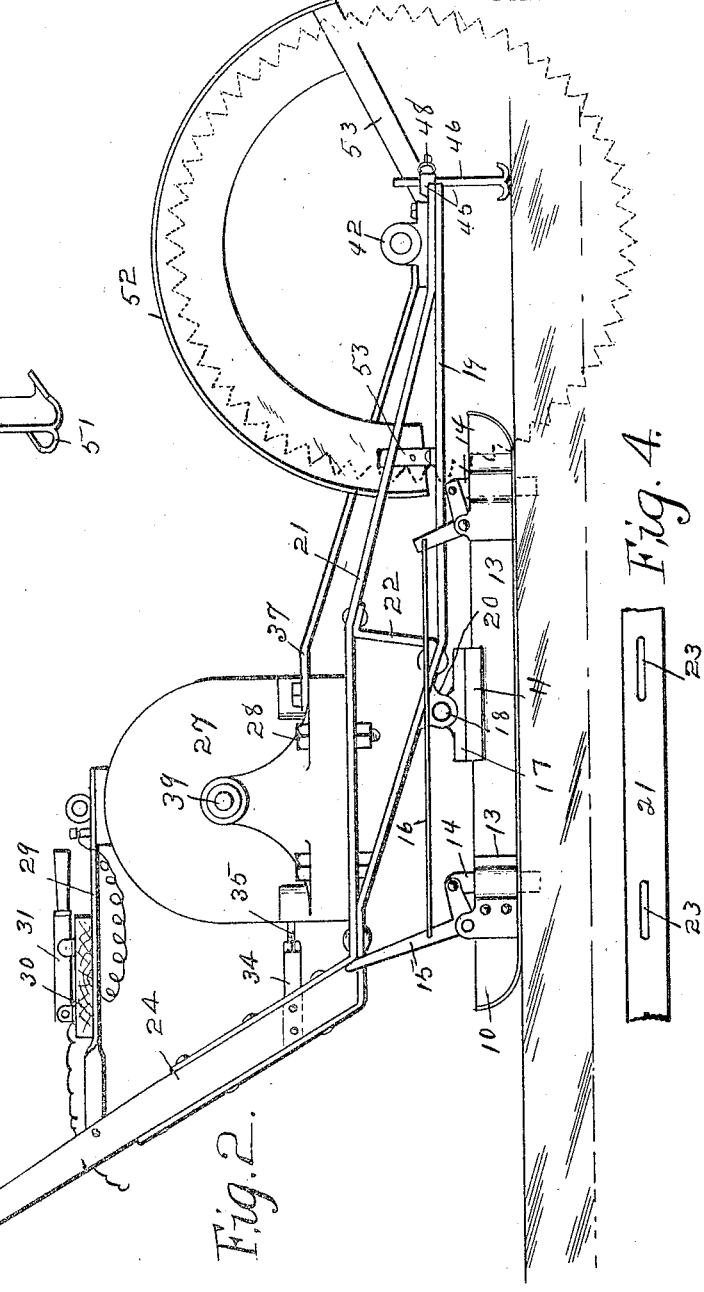

UNITED STATES PATENT OFFICE.

LUNA M. MACY, OF ADEL, IOWA.

ICE-CUTTING MACHINE.

1,102,989.

Specification of Letters Patent. Patented July 7, 1914.

Application filed June 20, 1907. Serial No. 379,887.

*To all whom it may concern:*

Be it known that I, LUNA M. MACY, a citizen of the United States, residing at Adel, in the county of Dallas and State of Iowa, have invented a certain new and useful Ice-Cutting Machine, of which the following is a specification.

The object of my invention is to provide an ice cutting machine of simple, durable and inexpensive construction, especially designed to be operated by an electric, gasolene or other motor, carried upon sled runners, and to provide a device of this kind that may be easily propelled over the ice by the operator grasping the handles so that no mechanism need be provided for advancing the machine, and further to provide a device of this kind in which the saw operating mechanism is mounted upon a tilting frame, and so balanced that the operator may easily press upon the handles and thus elevate the saw out of contact with the ice when turning around or moving from place to place, and further to provide improved and simplified means for guiding the device in a straight line along a cut previously made by the saw, and to provide means for withdrawing the guiding devices from their position below the runners so that they will not obstruct the device when being moved upon the runners.

My invention consists in certain details in the construction, arrangement and combination of the various parts of the ice cutting machine, whereby the objects contemplated are attained, as hereinafter more fully set forth, pointed out in my claims and illustrated in the accompanying drawings, in which—

Figure 1 shows a plan view of the complete device embodying my invention. Fig. 2 shows a side elevation of the same. Fig. 3 shows a detail perspective view of the adjustable support for the rear end of the machine, and Fig. 4 shows a detail view of a part of the frame illustrating the slots used in adjustably clamping the motor to the frame.

Referring to the accompanying drawings, I have used the reference numeral 10 to indicate the runners. These runners are spaced apart far enough to cover two of the strips of ice to be made by the saw. These runners are connected with each other by means of the cross piece 11 braced upon the runners by means of the rods 12. I provide guiding devices for the runners as follows: On the outer side of each runner I have fixed two guide brackets 13, and slidingly mounted in each is a guide bar 14 capable of up and down movement. Fulcrumed to each of the brackets 13 is a bell crank lever 15. These levers are connected by a rod 16 so that they may be operated in unison. The rear bell crank lever has a handle formed thereon for the convenience of the operator. By moving said handle rearwardly, both guide bars 14 may be raised above the surface of the ice, and when they are lowered they will enter a cut previously made in the ice by a saw or otherwise and form guides to hold the runners in proper position. It is to be understood in use the operator grasps the handles and advances the machine over the ice toward him so, that in the following description I have called the handle end of the machine the front.

Mounted upon the cross piece 11 are two brackets 17 in which the rock shaft 18 is mounted. The supporting frame of the machine, hereinafter described, is mounted upon this rock shaft. The frame comprises two longitudinal side bars 19 having their forward end portions inclined upwardly, as shown in Fig. 2. Fixed to these bars 19 are the bearing blocks 20, mounted upon the rock shaft 18. Above the bars 19 are two similar bars 21. The ends of the bars 19 and 21 are connected and their central portions are spaced apart and braced by the brace bars 22, thus forming a diamond shaped frame at each side of the machine to firmly brace and support it, and giving it a maximum of rigidity and strength with a minimum of material. The forward horizontal portions of the bars 21 are provided with slots 23, for purposes hereinafter made clear, and the extreme forward ends of the bars 19 and 21 are shaped to receive the handles 24 between them, as clearly shown in Fig. 2. At both the forward and rear ends are the cross pieces 25, connecting the side bars and these side bars are further braced by the closed braces 26.

Mounted upon the forward portions of the bars 21 is the electric motor 27 held in place on said bars by means of the bolts 28 passed through the slots 23, thus providing for adjustably supporting the motor in position. Slidingly mounted on the top of the motor are the supports 29, the forward ends of which are fixed to the handles. These supports have a switch board 30 mounted thereon and containing an electric switch 31 of the ordinary type connected by wires 32 with the motor and by wires 33 with a source of electrical supply. I further provide for adjusting and firmly supporting the motor in position as follows: Fixed to the handles 24 is a brace bar 34 having two bolts 35 extending through it, and provided with lock nuts 36 on opposite sides, the other ends of said bolts being fixed to the motor frame. At the rear of the motor I have fixed two rods 37, which rods extend rearwardly and downwardly, and are fixed to the rear ends of the frame. Each rod is provided with a turn buckle 38, by which its length may be adjusted. The advantage of having the motor adjustable on the frame is that the belt connecting the motor and saw may be kept at the proper tension. It is necessary in this connection that the motor when adjusted to proper position be firmly supported, and by providing the bolts 28 through the base, the adjusting bolts 35 at the forward end and the rods 37 at the rear end of the motor, it will be firmly and immovably held in position when adjusted.

The motor shaft is indicated by the numeral 39, and is connected by a belt or chain 40 with the saw bearing shaft 41, mounted in suitable bearings 42 at the rear end of the machine frame. Mounted on said shaft is the saw 43 so positioned that it will be equally centered between the runners. An adjustable saw guide 44 is mounted on the frame to engage the opposite sides of the saw and hold it in line.

In order to regulate the depth to which the saw will cut, I have provided a bracket 45 on the rear cross piece 25, and in this bracket an upright 46 is adjustably mounted. This upright is provided with a slot 47 and the bolt 48 is passed through a slot and seated in the rear cross piece. A nut 49 is placed on the bolt and provided with a handle 50. The lower end of the upright 46 is provided with a curved runner 51. I have provided a shield 52 to cover the upper portion of the saw, which shield is supported upon the brackets 53, as clearly shown in Fig. 2.

In practical use I connect the wires 33 with a suitable cable, which cable may be dragged over the ice after the machine. I first form a groove or saw cut in the ice. I then place one of the runners 10 over said groove and project the guide bars 14 into it. Then the motor is set in motion by the switch 31 and the saw rapidly revolved. The operator then grasps the handles and draws the machine toward him. When doing this the saw will aid slightly in advancing the machine over the ice and the operator will only have to pull slightly upon the handles in order to keep the saw in operative contact.

When the machine is operated in this way, the fine ice thrown from the saw will be thrown away from the operator and will not interfere with his handling the machine. When at the end of a cut, the operator presses downwardly on the handles, thus removing the saw from the ice; then the machine is turned around and the guide bars 14 on the opposite runner from the one used in the first cut will be placed in position in the cut previously made while the guide bars on the runner first used will be thrown to an elevated position.

Having thus described my invention, what I claim and desire to secure by Letters Patent of the United States, therefor is—

1. In an ice cutting machine the combination of a pair of spaced runners, a frame pivotally mounted upon said runners, said frame comprising a pair of side members having substantially a parallelogram configuration, bearings carried by the rearward end of the side members, a saw operatively mounted within said bearings, transverse bars for connecting the side members and handle bars carried by the front end of the side members for the purpose specified.

2. In an ice cutting machine, the combination with the pair of spaced runners, of a frame pivotally mounted upon said runners, said frame comprising a pair of side members and cross bars rigidly connecting the side members, said side members each consisting of upper and lower parallel bars, the opposite ends of said bars being bent diagonally and connected adjacent their extremities to the opposite bar, a diagonal bar connecting the upper and lower bars of each side member, a pair of bearings mounted upon the diagonal portions of the lower bars and adjacent the lower ends of said diagonal portions, a shaft carried by the runners and extending through said bearings to form a pivot connection between the runners and the frame, a pair of bearings carried by the rear ends of said side members, a saw operatively mounted within said bearings and handle bars secured within the front extremities and the upper and lower bars of the side members substantially for the purpose specified.

3. In an ice cutting machine the combination with a pair of runners, a saw operatively mounted upon said runners, of a pair of spaced brackets carried by the outer face of each runner, a vertical bar slidably mounted within each bracket, a bell crank pivotally mounted upon each bracket, means for pivotally connecting the upper end of the vertical bars with the said bell cranks and a bar connecting the bell cranks on each runner for the purpose specified.

4. In an ice cutting machine the combination with a pair of spaced runners, of a frame, said frame comprising side members and cross bars rigidly connecting the side members, said side members each consisting of an upper and lower bar being connected adjacent their rearward ends, means for pivotally mounting the lower bars upon the said runners, the upper bars each having a pair of elongated slots formed therein adjacent their front ends, means adjustably mounted within said slots for connecting a motor, means for adjustably connecting the rearward end of the side members with the motor, means for adjustably connecting the front end of the frame with the motor and a saw operatively mounted upon the rearward end of the frame substantially for the purpose specified.

LUNA M. MACY.

Witnesses:
S. F. CHRISTY,
W. R. LANE.